Patented July 17, 1951

2,560,971

UNITED STATES PATENT OFFICE 2,560,971

PRODUCTION OF GAMMA-FERRIC OXIDE HYDRATE AND GAMMA-FERRIC OXIDE

John Martin, Trenton, N. J., assignor to Columbian Carbon Company, New York, N. Y., a corporation of Delaware No Drawing. Application July 11, 1947, Serial No. 760,497

10 Claims. (Cl. 23—200)

This invention relates to the production of gamma-ferric oxide hydrate and gamma-ferric oxide, and particularly to a commercially practicable procedure whereby the desired products can be manufactured economically.

Several forms of ferric oxide hydrate and ferric oxide are known and are distinguished as alpha, beta and gamma, the distinction being based upon interpretation of the X-ray diffraction patterns of these compounds. It is known that in gamma-ferric oxide, there are two types of oxygen, one type being bound to iron atoms only, while each oxygen atom of the other type is linked to two iron atoms and two hydrogen atoms, whereas in the alpha form the oxygen atoms are structurally equivalent i. e., equivalently arranged. Gamma-ferric oxide hydrate is described in the literature only as the product of laboratory experiment. Pure gamma-ferric oxide hydrate and gamma-ferric oxide have not been produced commercially, since no satisfactory methods for production in volume have been known.

It is the object of the present invention to provide a simple and economical method whereby gamma-ferric oxide hydrate and gamma-ferric oxide may be produced in quantity for commercial applications.

Other objects and advantages of the invention will be apparent as it is better understood by reference to the following specification, in which the preferred procedure is described.

In carrying out the invention, a fairly strong solution (15% to 20% preferably) of ferrous chloride is prepared and heated to a temperature above 150° F., desirably between 180° and 200° F. The ferrous ion in the solution is completely precipitated by the rapid addition of a solution containing substantially a stoichiometric proportion of an alkali or alkaline earth metal hydroxide with continuous stirring. The precipitate as first formed is gelatinous, and the resulting slurry is very thick. However, if the slurry is held at a temperature of 180°–200° F. for 10–15 minutes, the slurry becomes quite thin. At this point, the heat is shut off and the slurry is cooled rapidly to room temperature.

Since the slurry becomes very gelatinous again upon cooling and during subsequent oxidation, it is desirable to dilute it substantially. Water may be used for dilution and simultaneous cooling of the slurry. An amount of water equal to about four times the volume of the original slurry may be used to bring the temperature to a point under 100° F. and preferably to about 75°–85° F.

It is preferable, however, to employ for dilution and cooling a weak solution (0.5–2.0%) of ferrous chloride in cold (about 60° F.) water. The amount of this solution may be equal to about four times the volume of the original slurry, and the addition of the solution should bring the temperature to preferably 75°–85° F.

The preferred procedure is to pour the hot ferrous hydrate slurry into the cooler solution. Agitation is maintained, and a strong current of air is directed through the mixture to rapidly oxidize the precipitate. In approximately two hours the precipitate will have been completely oxidized to a clean orange-yellow color. It may then be filtered and washed, and the pulp may be dried in an oven heated to about 230° F.

In order to increase the yield, and particularly to increase the size of the particles as is desirable to afford products suitable for various purposes, the cool slurry, after oxidation, may again be heated, preferably to 135°–150° F. Scrap iron is then added to the slurry, and aeration is continued. Fresh scrap iron should be added at least once in twenty-four hours. The oxidation is continued for three and one-half to four and one-half days. If continued for a week, the color becomes quite dark. At the completion of the operation, the slurry may be filtered, washed and dried in an oven to about 250° F.

The product in either case gives an X-ray diffraction pattern corresponding to that of gamma-ferric oxide hydrate prepared by the method of Baudisch and Albrecht (J. Am. Chem. Soc., 54, 943, 1932).

The product may be dehydrated by heating to a temperature of 450°–500° F. During the heating, the color will change to brown. The dehydrated product is gamma-ferric oxide. It is strongly ferromagnetic. It gives an X-ray diffraction pattern corresponding to gamma-ferric oxide as obtained by oxidation of magnetite.

The products of the procedures as herein described are especially useful as pigments and for other purposes for which such materials are adapted.

Various changes may be made in the procedures as described without departing from the invention or sacrificing the advantages thereof.

I claim:

1. The method of preparing gamma-ferric oxide hydrate which comprises precipitating the ferrous ion from a solution of ferrous chloride with a solution of a hydroxide of a metal of the class consisting of the alkali and alkaline earth metals at a temperature between 150° and 200° F. to form a thick slurry, maintaining the temperature until the slurry is thin, diluting and rapidly cooling the slurry to room temperature, and oxidizing it at room temperature until the product has a clean orange-yellow color.

2. The method of preparing gamma-ferric oxide hydrate which comprises precipitating the ferrous ion from a solution of ferrous chloride with a solution of a hydroxide of a metal of the class consisting of the alkali and alkaline earth metals at a temperature between 150° and 200° F. to form a thick slurry, maintaining the temperature until the slurry is thin, diluting and rapidly cooling the slurry to room temperature, oxidizing it at room temperature until the product has a clean orange-yellow color, and filtering, washing and drying the product.

3. The method of preparing gamma-ferric oxide which comprises heating the product of the method as described in claim 2 to a temperature between 450° and 500° F.

4. The method of preparing gamma-ferric oxide hydrate which comprises precipitating the ferrous ion from a solution of ferrous chloride with a solution of a hydroxide of a metal of the class consisting of the alkali and alkaline earth metals at a temperature between 150° and 200° F. to form a thick slurry, maintaining the temperature until the slurry is thin, diluting and rapidly cooling the slurry to room temperature by adding about 4 volumes of a solution of ferrous chloride in water, and oxidizing it at room temperature until the product has a clean orange-yellow color.

5. The method of preparing gamma-ferric oxide which comprises heating the product of the method as described in claim 4 to a temperature between 450° and 500° F.

6. The method of preparing gamma-ferric oxide hydrate which comprises precipitating the ferrous ion from a solution of ferrous chloride with a solution of a hydroxide of a metal of the class consisting of the alkali and alkaline earth metals at a temperature between 150° and 200° F. to form a thick slurry, maintaining the temperature until the slurry is thin, diluting and rapidly cooling the slurry to room temperature, and oxidizing it at room temperature with a current of air until the product has a clean orange-yellow color.

7. The method of preparing gamma-ferric oxide hydrate which comprises precipitating the ferrous ion from a solution of ferrous chloride with a solution of a hydroxide of a metal of the class consisting of the alkali and alkaline earth metals at a temperature between 150° and 200° F. to form a thick slurry, maintaining the temperature until the slurry is thin, diluting and rapidly cooling the slurry to room temperature, oxidizing it at room temperature until the product has a clean orange-yellow color, increasing the temperature to 135° to 150° F., adding metallic iron and continuing the oxidation at the higher temperature.

8. The method of preparing gamma-ferric oxide which comprises heating the product of the method as described in claim 7 to a temperature of 450° to 500° F.

9. The method of preparing gamma-ferric oxide hydrate which comprises precipitating the ferrous ion from a solution of ferrous chloride with a solution of a hydroxide of a metal of the class consisting of the alkali and alkaline earth metals at a temperature between 150° and 200° F. to form a thick slurry, maintaining the temperature until the slurry is thin, diluting and rapidly cooling the slurry to room temperature, oxidizing it at room temperature until the product has a clean orange-yellow color, increasing the temperature to 135° to 150° F., adding metallic iron, continuing the oxidation at the higher temperature, and filtering, washing and drying the product.

10. The method of preparing gamma-ferric oxide hydrate which comprises precipitating the ferrous ion from a solution of ferrous chloride with a solution of a hydroxide of a metal of the class consisting of the alkali and alkaline earth metals at a temperature between 150° and 200° F. to form a thick slurry, maintaining the temperature until the slurry is thin, diluting and rapidly cooling the slurry to room temperature by adding about 4 volumes of a solution of ferrous chloride in water, oxidizing it at room temperature until the product has a clean orange-yellow color, increasing the temperature to 135° to 150° F., adding metallic iron and continuing the oxidation at the higher temperature.

JOHN MARTIN.

REFERENCES CITED

The following references are of record in the file of this patent:

UNITED STATES PATENTS

| Number | Name | Date |
|---|---|---|
| 1,368,748 | Penniman and Zoph | Feb. 15, 1921 |
| 1,392,926 | Fireman | Oct. 11, 1921 |
| 1,424,635 | Fireman | Aug. 1, 1922 |
| 1,894,749 | Baudisch | Jan. 17, 1933 |
| 1,894,750 | Baudisch | Jan. 17, 1933 |
| 1,923,362 | Frazee | Aug. 22, 1933 |
| 2,111,727 | Plews | Mar. 22, 1938 |
| 2,127,907 | Fireman | Aug. 23, 1938 |
| 2,357,096 | Fireman | Aug. 29, 1944 |
| 2,388,659 | Ryan | Nov. 6, 1945 |

OTHER REFERENCES

Mellor, "Comprehensive Treatise on Inorganic and Theoretical Chemistry," vol. 13, pages 780, 781, 881, 884. Publ. by Longmans, Green & Co., 1934.

Baudisch and Albrecht, "J. Am. Chem. Soc.," vol. 54, March 1932, page 943.

Welo and Baudisch, "Chemical Reviews," vol. 15, 1934, pages 45–97.

Williams and Thewlis, "Trans. Faraday Soc.," vol. 27, 1931, pages 767–771.